United States Patent [19]

Katsurayama et al.

[11] 4,138,523

[45] Feb. 6, 1979

[54] FILM MATERIAL FOR FORMING BLACKBOARDS

[75] Inventors: Tadashi Katsurayama, Yokkaichi; Yoshio Nakamuro, Kuwana, both of Japan

[73] Assignee: Suzuka Paint Manufacturing Company, Limited, Yokkaichi, Japan

[21] Appl. No.: 861,301

[22] Filed: Dec. 16, 1977

[51] Int. Cl.² .................... B43L 21/00; B32B 7/02
[52] U.S. Cl. ........................... 428/216; 35/61; 35/66; 106/32.5; 428/215; 428/323; 428/325; 428/328; 428/330; 428/331; 428/500; 428/516; 428/425; 428/447; 428/520
[58] Field of Search ............... 428/425, 447, 215, 216, 428/373, 225, 328, 330, 331, 500, 516, 520, 32.5; 35/61, 66; 106/32.5

[56] References Cited

U.S. PATENT DOCUMENTS

| | | | |
|---|---|---|---|
| 3,027,343 | 3/1962 | Kane | 428/425 |
| 3,497,969 | 3/1970 | Schwoegler | 35/66 |
| 3,607,536 | 9/1971 | Bragole | 428/425 |
| 3,642,562 | 2/1972 | Kawaguchi | 428/447 |
| 3,655,423 | 4/1972 | Lin | 428/425 |
| 3,894,306 | 7/1975 | Sischka | 428/425 |
| 3,916,050 | 10/1975 | Kurhajec | 428/425 |
| 3,997,702 | 12/1976 | Schurb | 428/425 |
| 4,020,227 | 4/1976 | Deffeyes | 428/425 |

Primary Examiner—Ellis P. Robinson
Attorney, Agent, or Firm—Dennison, Dennison, Meserole and Pollack

[57] ABSTRACT

Disclosed is a plastics film material for forming blackboards, which comprises a film of polyethylene or polypropylene covered on one surface with a layer of paint. The layer of paint is made of polyurethane resin composed of polyol and polyisocyanate and containing a coloring pigment, a bulking agent, such as powdered alumina and powdered calcium carbonate, and in some cases, silicone oil or polyethylene wax. The film material is attached to a base board with the layer of paint exposed on the outside to form a blackboard.

10 Claims, 5 Drawing Figures

FILM MATERIAL FOR FORMING BLACKBOARDS

The present invention is relative to an improvement in the film material for forming blackboards. The film material has one surface coated with paint and its opposite surface is attached to a base board.

In conventional film materials for forming blackboards, paint is applied to a film made of soft vinyl chloride resin mixed with powdered quartz, silica and the like. Such a conventional film material made of vinyl chloride resin has a large flexibility and can be rolled up even if it has a large width and length, so that it may be carried easily to a desired place. Further, such a film can be handled easily because a rolled up film may be attached to a base board while being unwound. On the other surface of a blackboard, that is, on the painted surface of the film material, desired lines may be drawn by chalk and such lines may be wiped out employing a conventional eraser.

Such a film material is, however, so soft and flexible that movement of chalk is not smooth when lines are drawn thereon, in other words, the chalk touch is not good. Further, as urethane clear is applied to the surface, the blackboard surface becomes lustrous while it is rubbed repeatedly by an eraser. Further, when the lines drawn on the surface are wiped out, the remnants of chalk are apt to remain on the blackboard surface. Therefore, it is desired to provide a film materials having no such drawbacks but which is easy to roll up and handle.

It has heretofore been difficult to provide such blackboard material because good chalk adherence it what is inconsistent with the ease of wiping out chalk lines.

It is an object of this invention to provide a film material for forming blackboards which is easy to handle and presents a good chalk touch.

It is another object of this invention to provide a film material for forming blackboards which presents good and easy chalk adherence and removal, and which provide a blackboard surface which will not become lustrous even though rubbed repeatedly by an eraser.

In the present invention, a hard layer of polyurethane resin is prepared on one surface of a hard film of polyethylene or polypropylene by applying polyurethane paint thereto. The polyurethane paint is composed of two solutions, i.e., a main solution containing (a) polyol having many hydroxyl groups such as acrylic ester resins, (b) coloring pigments, (c) extender, (d) bulking agents such as powdered alumina, and (e) a solvent, and a hardening solution containing polyisocyanate and a solvent.

The main and hardening solutions are mixed together immediately before application thereof on a film of polyethylene, etc. The film thus prepared is rigid, but is still so flexible that it may be rolled up easily. A blackboard having a hard surface may be obtained when the film is attached to a base board with the paint layer exposed on the outside.

The blackboard thus obtained has a writing surface which is excellent with respect to chalk adherence and chalk removal.

Further, when a small amount of silicone oil or polyethylene wax is added to the main paint solution, the paint layer becomes smooth and makes it easier to remove chalk.

The above and further objects and novel features of the invention will more fully appear from the following detailed description when the same is read in connection with the accompanying drawings. It is to be expressly understood, however, that the drawings are for purpose of illustration only and are not intended as a definition of the limits of the invention.

The film material of this invention is prepared by applying polyurethane paint uniformly on one side of a film of polyethylene or polypropylene. The film is then attached to a base board, such as a wooden board, a veneer board, a particle board and a fiber board, by means of a commercially available plastics adhesive with a layer of paint exposed on the outside.

A film of polyethylene or polypropylene is so flexible and strong against bending in spite of its large hardness that it may easily be rolled up. Accordingly, the film of this invention has a very good touch of chalk and yet is easy to handle.

Suitable films of polyethylene include a film of hard polyethylene prepared in a low pressure method, where polyethylene is polymerized under a low pressure of approximately 1–6 atm. at a low temperature of approximately 60–80° C. or prepared in a medium pressure method, where polyethylene is polymerized under a relatively low pressure of approximately 30–40 atm. at a relatively low temperature of approximately 90–150° C. This hard polyethylene is of high density with a specific gravity of approximately 0.92–0.96 and has a relatively hard touch, but films of this material may be rolled up easily.

Polypropylene films made in conventional methods may be used in this invention. This film is bendable and has a specific gravity of approximately 0.90–0.91.

Films of polyethylene or polypropylene of any prefered dimensions having a thickness of approximately 0.04–1.00 mm may be used. if the film is thinner, it is less easy to handle, while if it is thicker, it presents a poor chalk touch.

Conventional paints for forming blackboards are made by adding inorganic bulking agents to oil paints, while in this invention, a bulking agent is added to a polyurethane or polyurethane resin paint.

The polyurethane paint used in this invention is composed of two types of solutions, i.e., a main solution prepared by adding polyol, pigments, and a bulking agent into a solution of acetone, toluene and the like and mixing and kneading them by means of a grain mill, ball mill, roller or the like; and a hardening solution for hardening the main solution, the main component thereof being polyisocyanate. The main and hardening solutions are mixed together immediately before the application thereof on a base board. The polyurethane paint is hardened by polyol and polyisocyanate, but the polyol and polyisocyanate may be changed to any other combinations, in which the mixture of the main and hardening solutions is hardened to the extent that the hardness of the hardened paint layer falls between 3H and B in terms of pencil hardness.

Castor oil or acrylpolyol such as acrylic ester resins including many hydroxyl groups (hydroxyl value: 5–100) may be used as the polyol. Polyesters made of dicarboxylic acids such as adipic acid, phthalic acid, sebacic acid and dimer acid and monomers of polyhydric alcohols such as ethylene glycol, diethylene glycol, propylene glycol, butylene glycol, 1,3-butanediol, hexane triol, trimethylol propane, and having hydroxyl groups at the molecule end may be used in the same way as the polyols such as castor oil and acrylopolyols mentioned above.

Tolylene diisocyanate, 4,4-diphenyl methane diisocyanate, hexamethylene diisocyanate, 1,5-naphthalene diisocyanate, triphenylmethane triisocyanate and the like added with ethylene glycol, diethylene glycol, propylene glycol, buthylene glycol, 1,3-buthanediol, hexane triol, trymethylol propane and the like in the amount of less than the reaction equivalent thereof may be used as the polyisocyanate.

The mixing ratio of the solid contents of the extender and coloring pigment to those of the polyol or the polyester having hydroxyl groups at the molecule end and the polyisocyanate is 10-50 : 90-50. The total solid contents of said extender, coloring pigment, polyol and polyisocyanate are limited to approximately 10-70% of the paints; in other words, the paint contains 90-30% of solvent.

Polyurethane paint including bulking agent and coloring pigments may have a larger hardness than urethane clear paints conventionally used. In the employment of the above polyurethane paints, increasing of luster on the painted surface of a blackboard due to rubbing by an eraser may be prevented and the durability of the blackboard may be improved. Inorganic fine grains, such as powdered alumina, calcium carbonate, aluminum hydroxide and silicic anhydride, may be used as the bulking agent. From the results of experiments, it is preferable that the paint contain 85-95 weight percent of bulking agent having a grain diameter of 7.5-20 $\mu$, and 15-5 weight percent of bulking agent having a grain diameter of 50-70 $\mu$. If the grain diameter of the bulking agent is larger, chalk lines on the blackboard become rough and difficult to wipe out. If the grain diameter of the bulking agent is smaller, chalk slips on the blackboard surface and makes writing difficult. It is desirable to mix a small amount of liquid silicone oil or fine-grained polyethylene wax (polyethylene of a low polymerization degree) into the paint to make chalk lines easier to wipe out. It is preferable to add approximately 0.01-0.5 weight percent of silicone oil relative to the weight of the paint, but if too much silicone oil is added, the paint layer tends to be easily damaged, while if too small silicone oil is used, it fails to produce the advantage described above.

Both silicone oil and polyethylene wax may be used together. In such a case, about a half of the amount described above of each of silicone oil and polyethylene wax is preferably used. In other words, approxmately 0-0.5 weight percent of silicone oil and approximately 1.0-0 weight percent of polyethylene wax may be mixed properly into the paint. When silicone oil and polyethylene wax are used together, the blackboard obtains better chalk adherence and removal characteristics than when only one of said substances is added.

Films of polyethylene or polypropylene usually require surface treatment to adapt the surface for better adherence of urethane paints. It is preferable that such surface treatment be given to both surfaces of a film to improve its adherence to a base board, as well as paint adherence.

It is preferable to treat the surfaces by soaking the film in a heated solution of concentrated sulfuric acid containing potassium bichromate or by applying corona discharge or ozone oxidization. As the paint adheres to the surface of the film firmly, it may be applied repeatedly. Should the surface of the film not easily accept paints even after it is treated as above, a primer having a good adhesive property is applied onto the treated surface of the film and after the primer is dried, urethane paint is applied on the layer of the primer to form a layer of paint firmly adhering to the base film.

Preferably, the thickness of the paint layer is approximately 20-70 $\mu$, including approximately 5-10 $\mu$ of primer thickness. If the paint layer is thinner, chalk adherence is not good, while if it is thicker, the paint tends to crack easily when the film is rolled.

Paints may be applied to the base film by many methods, such as air spray, airless spray, electrostatic spray painting, roller painting, reverse roll coating, brush painting, curtain flow coating, knife coating, air knife coating, and photogravure printing. One of the advantages of forming a blackboard employing film material is that a a balckboard having a good even surface can easily be obtained simply by attaching the film material to a base board with an adhesive. When a blackboard is prepared by applying paints directly on a base board, the painted surface should be ground and polished to provide an even blackboard surface. Therefore, the layer of paint prepared on the base film should preferably have a surface which is as even as that of a blackboard prepared by grinding and polishing. For this reason, the paint should preferably be applied by photogravure printing, reverse roll coating, knife coating, air knife coating or curtain flow coating. When photogravure printing is employed, it is necessary to repeat printing for several times to obtain a layer of paint having a desired thickness.

A base board on which a film material for forming a blackboard is attached is required to have an even surface. It is convenient to use a single-component emulsion as an adhesive when porous boards, such as fiber boards or lauan veneer boards, are employed as the base boards. Vinyl acetate resin emulsion prepared by emulsification and polymerization of vinyl acetate monomers and acrylic emulsion prepared by emulsification and polymerization of acrylic ester are examples of suitable adhesives.

When dense boards, such as steel plates, glass plates, plastic plates, processed veneer boards and processed fiber boards, are used as the base boards, it is convenient to employ dual-component epoxy adhesives containing no solvent.

The emulsion adhesives and epoxy adhesives may be easily selected from among those which are commercially available.

The invention will now be described in further detail by way of example with reference to the accompanying drawings, in which.

EXAMPLE 1

A polypropylene film 1 measuring 0.09 mm thick, 100 cm long and 250 cm wide is soaked in a solution (room temperature) prepared by dissolving 50 g of potassium bichromate in 1 liter of concentrated sulfuric acid for about 360 minutes, and then, it is washed in water and dried (surface treatment). Then, a liquid primer prepared by mixing copolymerized resin of vinyl acetate and ethylene with phenol resin at a ratio of 1 to 1 is applied on one surface 1A of the film by a photogravure printing press. The printed surface 1A is dried immediately thereafter by applying hot air having a temperature of 70° C. for three minutes for forming a layer of primer having a thickness of 7 μ.

Figure 2:
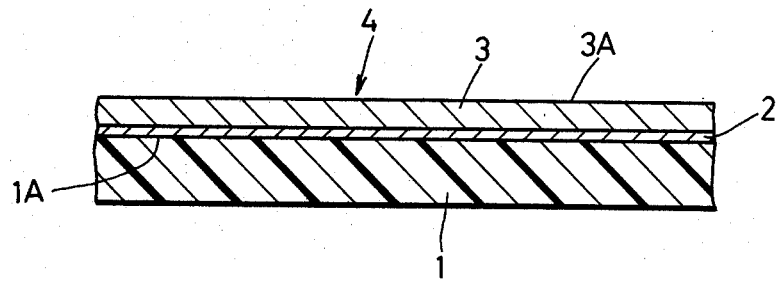
FIG. 2 is an enlarged cross sectional view of principal parts of the film material of Example 1.
Figure 4:
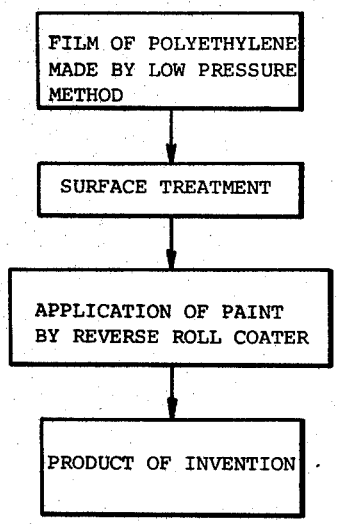
FIG. 4 is a chart showing a process for obtaining a film material as described in Example 2.

A main solution and a hardening solution, Combination A shown in Table 1 below, are prepared and mixed together to prepare a paint. The paint is printed on the layer of primer 2 on the polyethylene film 1 by a photogravure printing press and the printed surface is dried by applying hot air having a temperature of 70° C. for three minutes. After that, the paint is again printed on the primer surface and the surface is dried again by applying hot air having a temperature of 70° C. thereto. Thus, a film material 4 carrying a layer of paint 3 having a thickness of approximately 15 μ is obtained (See FIG. 2).

The film material 4 has a good bending property and can be rolled easily.

Table 1

| Combination A of a paint for forming blackboards | |
|---|---|
| Main Solution | |
| Olestar 603 (Mitsui Toatsu K.K., Japan, 50% of acrylic polyol resins, 50% of toluene) | 39.2 (weight percent) |
| Phthalocyanine Blue (Navy blue coloring pigment) | 1.63 |
| Chrome yellow (yellow pigment) | 2.18 |
| α- alumina impalpable powder (central grain diameter: 4.5 μ) | 2.73 |
| Calcium carbonate (grain diameter:0.5-7.5 μ) | 5.45 |
| Calcium carbonate (grain diameter:0.5-5.0 μ) | 10.90 |
| Aluminum hydroxide (grain diameter:4.5-20 μ) | 2.73 |
| Silicic anhydride (grain diameter: 7 μ) | 3.27 |
| Disparon 4200-20 (Kusumoto Kasei K.K., Japan, polyethylene wax dispersion impalpable powder, 20% solid contents) | 0.55 |
| Toray silicone SH-7 (Toray Silicone K.K., Japan, silicone 5%) | 0.55 |
| Treated asbestos (Union Carbide Corp. RG-244) | 0.14 (weight percent) |
| n-butyl acetate | 18.80 |
| Xylole | 8.80 |
| Hardening Agent | |
| Desmodur L-75 (Byer, solid polyisocyanate: 75%, ethyl acetate: 25%) | 3.03 |
| Total | 100.00 (weight percent) |

Figure 1:
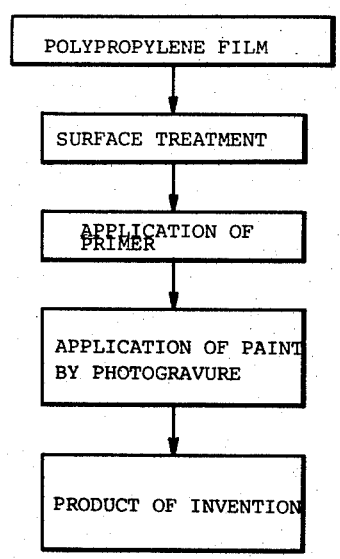
FIG. 1 is a chart showing a process for obtaining a film material as described in Example 1.
Figure 3:
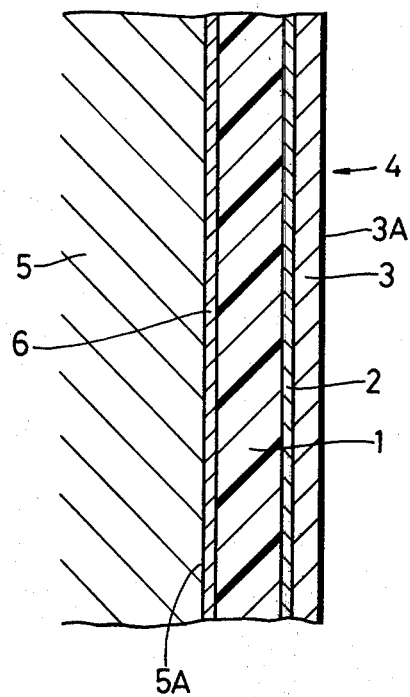
FIG. 3 is an enlarged cross sectional view of principal parts of the film material of Example 1 attached to a hard fiber board.

Seven days after printing the film material 4 is attached to an even surface 5A of a floor-mounted, upstanding hard fiber board 5 by vinyl acetate resin emulsion adhesive 6 with paint layer 3 exposed on the outside to form a desired blackboard (See FIG. 3). The results of tests demonstrate that the blackboard has a surface showing very good chalk adherence and easy, quick and complete chalk removal by a conventional eraser. Further, the surface of the paint layer 3A is hard enough not to be damaged easily, and does not become lustrous after it is rubbed repeatedly by the eraser.

EXAMPLE 2

A film 11 of polyethylene prepared in a low pressure method and measuring 0.1 mm thick, 100 cm long and 250 cm wide is soaked in a solution of concentrated sulfuric acid having a temperature of 50° C. and containing potassium bichromate for 60 minutes for surface treatment. Then, the film 11 is washed in a water thoroughly and dried in the atmosphere.

Figure 5:
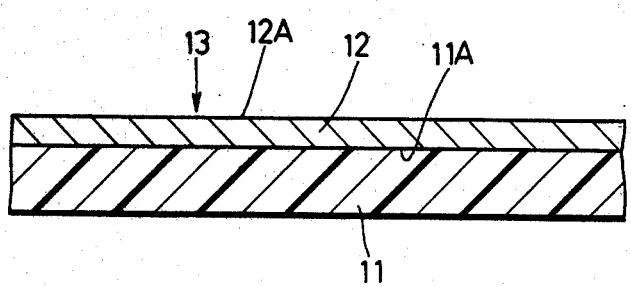
FIG. 5 is an enlarged cross sectional view of principal parts of the film material of Example 2.

A main paint solution and a hardening agent, Combination B shown in Table 2 below, are prepared and mixed together to prepare a paint. The paint is applied on one surface 11A of the film 11 employing a reverse roll coater and immediately after that, the painted surface 11A is dried by applying hot air having a temperature of 70° C. for three minutes for forming a layer of paint 12. Further, the paint is again applied on the paint layer 12 employing a reverse roll coater and the painted surface is again dried. Thus, a film material 13 for forming the surface of a blackboard is obtained, which has a layer of paint 12 having a thickness of approximately 30 μ (See FIG. 5).

The film material 13 is allowed to dry in the open air for seven days. The film material 13 may easily be rolled up and neither wrinkles nor peeling of the paint is found on the paint layer 12. The film material 13 formed into a roll is attached to a wall-mounted lauan veneer board (not shown) employing a vinyl acetate resin emulsion adhesive as it is gradually unwound to form a blackboard. Tests demonstrate that the blackboard has a surface showing very good chalk adherence and easy, quick and complete chalk removal by a conventional eraser. Furthermore, the blackboard surface does not become lustrous even after it is rubbed repeatedly by the eraser.

Table 2

| Combination B of a paint for forming blackboards | |
|---|---|
| Main Solution | |
| Olestar 603 | 39.24 (weight percent) |
| Phthalocyanine Blue | 1.63 |
| Chrome yellow | 2.18 |
| α- alumina impalpable powder | 2.73 |
| Calcium carbonate (grain diameter: 0.5 - 7.5 μ) | 5.45 |
| Calcium carbonate (grain diameter: 0.5 - 5.0 μ) | 10.90 |
| Aluminum hydroxide (grain diameter: 7.5 - 20 μ) | 2.73 |
| Silicic anhydride (grain diameter: 7 μ) | 3.27 |
| Hi-flat T-10P-5 (Gifu Shellac Manufacturing Company, Japan, polyethyelene wax dispersion, 10% solid contents) | 1.10 |
| Toray silicone DC-7 paint additive (Toray Silicone K.K., Japan, silicone: 5%) | 0.55 |
| Treated Asbestos | 0.14 |
| n-butyl acetate | 18.80 |
| Xylole | 8.25 |
| Hardening Agent | |
| Desmodur L-75 | 3.03 |
| Total | 100.00 (weight percent) |

What is claimed is:

1. A flexible coated film material for forming a writable surface of a blackboard when attached to a base board, comprising a film selected from the group consisting of polyethylene and polypropylene, the film having a thickness of 0.04 to 1.00 mm, and a layer of polyurethane resin paint covering one surface of said film, the layer having a thickness of approximately 20 to 70 microns, the paint containing a bulking agent of which approximately 85 to 95% by weight has a grain diameter of 7.5 to 20 microns and approximately 5 to 15% by weight has a grain diameter of 50 to 70 microns, the paint further containing a lubricating agent selected from the group consisting of silicone oil and polyethylene wax, said bulking agent and lubricating agent being evenly distributed in the polyurethane resin paint, said polyurethane layer providing said writable surface and said lubricating agent being present in an effective amount to facilitate erasure of a written image on said writable surface.

2. The film material of claim 1 wherein at least one surface of the film is treated to enhance the adherence of the paint to the surface of said film.

3. The film material of claim 2 wherein the surface of the film on the opposite side thereof from the surface coated with the paint is also treated to enhance the adherence of the film to the base board.

4. The film material of claim 2 wherein the surfaces of the film are treated by soaking the film in a heated solution of concentrated sulfuric acid and potassium bichromate at approximately 50° C. for approximately 60 minutes.

5. The film material of claim 4 wherein the solution contains potassium bichromate in a concentration equivalent to approximately 50 grams of potassium bichromate in one liter of concentrated sulfuric acid.

6. The film material of claim 2 wherein the surface of the film is treated by corona discharge.

7. The film material of claim 2 wherein the surface of the film is treated by ozone oxidation.

8. The film material of claim 1 wherein the polyurethane resin paint is comprised of a mixture of a solution of polyol, coloring pigments, bulking agent and lubricating agent and a hardening solution containing polyisocyanate, the hardness of the paint layer being between 3H and B in terms of pencil hardness.

9. A flexible coated film material for forming a writable surface of a blackboard when attached to a base board, comprising a film selected from the group consisting of polyethylene and polypropylene, the film having a thickness of 0.4 to 1.00 mm, the film further having a layer formed on one surface of said film by applying a liquid primer thereto and immediately drying said liquid primer to form the layer, the liquid primer being formed by mixing copolymerized resin of vinyl acetate and ethylene with phenol resin at a ratio of 1:1, the dried layer having a thickness of approximately 5 to 10 microns, the surface of the layer not contacting the surface of the film further having a layer of polyurethane resin paint formed thereon, the polyurethane layer having a thickness of approximately 20 to 70 microns including a primer layer thickness of between approximately 5 to 10 microns and, the paint containing a bulking agent of which approximately 85 to 95% by weight has a grain diameter of 7.5 to 20 microns and approximately 5 to 15% by weight has a grain diameter of 50 to 70 microns, the paint further containing a lubricating agent selected from the group consisting of silicone oil and polyethylene wax, said bulking agent and lubricating agent being evenly distributed in the polyurethane resin paint, said polyurethane layer providing said writable surface and said lubricating agent being present in an effective amount to facilitate erasure of a written image on said writable surface.

10. The film material of claim 3 wherein the surfaces of the film are treated by soaking the film in a heated solution of concentrated sulfuric acid and potassium bichromate at approximately 50° C. for approximately 60 minutes.

* * * * *

UNITED STATES PATENT AND TRADEMARK OFFICE
CERTIFICATE OF CORRECTION

PATENT NO. : 4,138,523
DATED : February 6, 1979
INVENTOR(S) : TADASHI KATSURAYAMA ET AL It is certified that error appears in the above-identified patent and that said Letters Patent are hereby corrected as shown below:

IN THE SPECIFICATION OF THE PATENT:

Column 2, line 37, cancel "if" and insert -- If --.

Column 4, line 16, cancel "balckboard" and insert -- blackboard --.

IN THE CLAIMS:

Claim 9, line 5, cancel "0.4" and insert -- 0.04 --.

Signed and Sealed this

Twelfth Day of June 1979

[SEAL]

Attest:

RUTH C. MASON
Attesting Officer

DONALD W. BANNER
Commissioner of Patents and Trademarks